(12) United States Patent
Bonissone et al.

(10) Patent No.: US 7,937,334 B2
(45) Date of Patent: May 3, 2011

(54) SYSTEM AND METHOD FOR DEFINING NORMAL OPERATING REGIONS AND IDENTIFYING ANOMALOUS BEHAVIOR OF UNITS WITHIN A FLEET, OPERATING IN A COMPLEX, DYNAMIC ENVIRONMENT

(75) Inventors: Piero Patrone Bonissone, Schenectady, NY (US); Weizhong Yan, Clifton Park, NY (US); Naresh Sundaram Iyer, Clifton Park, NY (US); Kai Goebel, Mountain View, CA (US); Anil Varma, Clifton Park, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 1006 days.

(21) Appl. No.: 11/755,924

(22) Filed: May 31, 2007

(65) Prior Publication Data

US 2008/0091630 A1    Apr. 17, 2008

Related U.S. Application Data

(60) Provisional application No. 60/803,604, filed on May 31, 2006.

(51) Int. Cl.
*G06F 17/00* (2006.01)
(52) U.S. Cl. .................. 706/11; 706/45; 340/945
(58) Field of Classification Search .............. 76/45, 12; 340/945, 946, 959; 706/12, 14, 11, 45, 46
See application file for complete search history.

(56) References Cited

U.S. PATENT DOCUMENTS

| | | | | |
|---|---|---|---|---|
| 6,681,382 B1 * | 1/2004 | Kakumani et al. | | 717/122 |
| 7,027,953 B2 * | 4/2006 | Klein | | 702/184 |
| 2002/0143575 A1 * | 10/2002 | Hansen et al. | | 705/2 |
| 2004/0044987 A1 * | 3/2004 | Kompalli et al. | | 717/100 |
| 2005/0096873 A1 * | 5/2005 | Klein | | 702/184 |
| 2006/0005204 A1 * | 1/2006 | Siegel et al. | | 719/313 |
| 2006/0242640 A1 * | 10/2006 | Pauly et al. | | 717/174 |
| 2007/0073724 A1 * | 3/2007 | Walsh | | 707/10 |
| 2008/0256093 A1 * | 10/2008 | Amitay et al. | | 707/100 |

OTHER PUBLICATIONS

Wagner, A. and Plattner, B. 2005. Entropy Based Worm and Anomaly Detection in Fast IP Networks. In Proceedings of the 14th IEEE international Workshops on Enabling Technologies: infrastructure For Collaborative Enterprise (Jun. 13-15, 2005). WETICE. IEEE Computer Society, Washington, DC, 172-177.*

(Continued)

*Primary Examiner* — Donald Sparks
*Assistant Examiner* — David H Kim
(74) *Attorney, Agent, or Firm* — Bracewell & Giuliani LLP (57) ABSTRACT

Monitoring dynamic units that operate in complex, dynamic environments, is provided in order to classify and track unit behavior over time. When domain knowledge is available, feature-based models may be used to capture the essential state information of the units. When domain knowledge is not available, raw data is relied upon to perform this task. By analyzing logs of event messages (without having access to their data dictionary), embodiments allow the identification of anomalies (novelties). Specifically, a Normalized Compression Distance (such as one based on Kolmogorov Complexity) may be applied to logs of event messages. By analyzing the similarity and differences of the event message logs, units are identified that did not experience any abnormality (and locate regions of normal operations) and units that departed from such regions.

16 Claims, 7 Drawing Sheets

OTHER PUBLICATIONS

Ke Wang and Salvatore J. Stolfo. Anomalous Payload-Based Network Intrusion Detection. Recent Advances in Intrusion Detection, Lecture Notes in Computer Science, 2004, vol. 3224/2004, 203-222.*

LiJie Yu; Cleary, D.J.; Cuddihy, P.E.; , "A novel approach to aircraft engine anomaly detection and diagnostics," Aerospace Conference, 2004. Proceedings. 2004 IEEE , vol. 5, No., pp. 3468-3475 vol. 5, Mar. 6-13, 2004.*

Wenke Lee; Dong Xiang; , "Information-theoretic measures for anomaly detection," Security and Privacy, 2001. S&P. 2001. Proceedings. 2001 IEEE Symposium on , vol., No., pp. 130-143, 2001.*

Keogh, E., Lonardi, S., and Ratanamahatana, C. A. 2004. Towards parameter-free data mining. In Proceedings of the Tenth ACM SIGKDD international Conference on Knowledge Discovery and Data Mining (Seattle, WA, USA, Aug. 22-25, 2004). KDD '04. ACM, New York, NY, 206-215.*

Ming Li; Xin Chen; Xin Li; Bin Ma; Vitanyi, P.M.B.; , "The similarity metric," Information Theory, IEEE Transactions on , vol. 50, No. 12, pp. 3250-3264, Dec. 2004.*

Paul Vitanyi. Universal Similarity. In the Proc. of IEEE ISOC ITW2005 on Coding and Complexity; editor M.J. Dinneen; co-chairs U. Speidel and D. Taylor; pp. 238-243. Aug. 29-Sep. 1, 2005.*

Eiland, E. E. and Liebrock, L. M. 2006. An Application of Information Theory to Intrusion Detection. In Proceedings of the Fourth IEEE international Workshop on information Assurance (Apr. 13-14, 2006). IWIA. IEEE Computer Society, Washington, DC, 119-134.*

Stephanie Wehner. Analyzing Worms and Network Traffic using Compression. http://arxiv.org/abs/cs/0504045. Apr. 12, 2005.*

Cilibrasi, R.; Vitanyi, P.M.B.; , "Clustering by compression," Information Theory, IEEE Transactions on , vol. 51, No. 4, pp. 1523-1545, Apr. 2005.*

* cited by examiner

FIG. 1

| FAULT CODES | Flight # 1 | Flight # 2 | Flight # 3 | ... | Flight # n |
|---|---|---|---|---|---|
| Fault code 1 | c(1,1) | c(1,2) | c(1,3) | | c(1,n) |
| Fault code 2 | | | | | |
| Fault code f | c(f,1) | c(f,2) | c(f,3) | | c(f,n) |
| Duration | d(1) | d(2) | d(3) | | d(n) |

SYSTEM AND METHOD FOR DEFINING NORMAL OPERATING REGIONS AND IDENTIFYING ANOMALOUS BEHAVIOR OF UNITS WITHIN A FLEET, OPERATING IN A COMPLEX, DYNAMIC ENVIRONMENT

RELATED APPLICATIONS

This application claims the benefit of U.S. Provisional Patent Application No. 60/803,604 filed on May 31, 2006 and entitled "AUTOMATED KERNEL EXTRACTION SYSTEM AND APPROACH FOR FINDING DISCRIMINATORY FEATURES", which is hereby incorporated by reference in its entirety for all purposes.

This application is related to U.S. patent application Ser. No. 11/755,898 filed on May 31, 2007 and entitled "A METHOD AND SYSTEM OF CREATING HEALTH OPERATING ENVELOPE FOR DYNAMIC SYSTEMS BY UNSUPERVISED LEARNING OF A SEQUENCE OF DISCRETE EVENT CODES", which is hereby incorporated by reference in its entirety for all purposes.

This application is related to U.S. patent application Ser. No. 11/755,893 filed on May 31, 2007 and entitled "AUTOMATED KERNEL EXTRACTION", now U.S. Pat. No. 7,814,034, which is hereby incorporated by reference in its entirety for all purposes.

This application is related to U.S. patent application Ser. No. 11/682,025 filed on Mar. 5, 2007 and entitled "Kernel Split Find: A Method for Fault Detection and Localization in Time Series and Spatial Data", which is hereby incorporated by reference in its entirety for all purposes.

TECHNICAL FIELD OF THE INVENTION

The present invention relates generally to the use of complexity metrics to define regions of normal and abnormal operational behavior among a fleet of dynamic systems (therein referred to as units).

BACKGROUND OF THE INVENTION the concept of Kolmogorov Complexity is based on the amount of information contained in a string and one's ability to replicate the information with a program or model, which will be shorter than the original data. For instance, a sequence "x", composed of 10,000,000 zeroes, could be represented by a much shorter program that generates the string by concatenating 10,000,000 zeroes. The minimum length of such program $P(x)$, is referred to as $|P(x)|=K(x)$.

To do the same with another string "y", using $P(x)$ as the starting point for encoding y, one can indicate this as $P(x,y)$, and the minimum length of such program as $|P(x,y)|=K(x,y)$. Assuming that "y" is similar to "x", then $P(x)$ would be a good starting point for $P(x,y)$ and only small changes would be needed to generate "y" from $P(x,y)$. Alternatively, when y is completely unrelated to "x". Then our starting point would not provide any advantage. This concept is captured by the Normalized Information Distance (NID), which is defined as:

$$NID(x, y) = \frac{K(x, y) - \min\{K(x), K(y)\}}{\max\{K(x), K(y)\}}$$

Since $K(x)$ is actually not computable, one must use a surrogate. To this end a compressor may be utilized, which compresses a string to make its storage or transmission more efficient. One can denote the length of the compressed string "x" as $C(x)$. The metric—analogous to the NID—is the Normalized Compression Distance (NCD), which is defined as:

$$NCD(x, y) = \frac{C(x, y) - \min\{C(x), C(y)\}}{\max\{C(x), C(y)\}}$$

When $C(x)<C(y)$, then the metric $NCD(x,y)$ captures the improvement due to compressing string "y" using string "x" as the previously compressed database (numerator), with compressing string "y" from scratch (denominator).

These concepts have been previously used to create static classification, affinity groups in music [showing musical similarities/differences of various composers, linguistic taxonomies [showing the hierarchical grouping of many natural languages], biological taxonomies [showing the hierarchical grouping of animals based on DNA similarities], etc.

SUMMARY OF THE INVENTION

Embodiments of the present invention are directed to systems and methods that are further described in the following description and claims. Advantages and features of embodiments of the present invention may become apparent from the description, accompanying drawings and claims.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the Figs., like numerals being used to refer to like and corresponding parts of the various drawings.

Embodiments of the present invention pertain to the use of complexity metrics to define regions of normal and abnormal operational behavior among a fleet of dynamic systems (herein referred to as units). Specifically, embodiments may describe a method and system for defining a featureless similarity among units of a fleet. The similarity is based on a stream of information, such as the real-time collection of unit-related events in an event log.

This information can then be used to compute pairwise dissimilarities, which will determine the degree to which one unit's behavior differs from another, strictly based on the generation of event messages. An N-dimensional vector composed of the pairwise differences between a unit and all other ones. one can track these N-dimensional vectors over time, projecting their time-stamped n-dimensional positions onto a 2-dimensional plane for visualization, and define regions of normal (as well as abnormal) unit behaviors. This method and system provide us with early warning detection of anomalies that will allow us to allocate additional monitoring resources, schedule preventive maintenance, limit down-time, and in general reduce the cost of unexpected maintenance events.

Embodiments of the present invention pertain relate to a method and system for detecting anomalous behavior among units in a fleet, operating in dynamic environment. For example, it provides early detection of anomalies in a fleet of aircraft, trucks or CT scanners. The method extends complexity metrics to monitor and classify the behaviors of dynamic systems, i.e. dynamic units operating in complex, dynamic environments. In these environments, two units that are close to each other at a given time might, later on, exhibit increasingly different behaviors, departing from each other. One can monitor their trajectory and their relative distance from a shared reference point. More specifically, one can monitor the formation of clusters [of units], and their modifications over time. This can be used to identify regions of operational normality, units that belong to those regions, units that start departing from them and units that have become clear anomalies. While this goal has been attempted previously by clustering techniques defined over feature spaces, embodiments of the present invention perform this at a lexical level [by comparing the presence/absence of event messages that characterize each unit's behavior], without resorting to semantics [by extracting features based on domain knowledge].

When monitoring dynamic units that operate in complex, dynamic environments, it is desirable to classify and track their behavior over time. When domain knowledge is available, one can use feature-based models that capture the essential state information of the units. When domain knowledge is not available, one can rely on raw data to perform this task. Embodiments of the present invention identify anomalies (novelties) by analyzing logs of event messages (without having access to their data dictionary). Specifically, these embodiments may use a Normalized Compression Distance (NCD) (based on Kolmogorov Complexity) and apply the NCD to logs of event messages. By analyzing the similarity and differences of the event message logs, one can identify units that did not experience any abnormality (and locate regions of normal operations) and units that departed from such regions. Of particular interest is the detection and identification of units' epidemics, which one can define as sustained/increasing numbers of anomalies over time. This approach can be applied to a variety of domains, from monitoring a fleet of aircraft based on FADEC messages, to monitoring a fleet of CT scanners, based on their message logs.

One embodiment of the present invention is illustrated with a larger system, in which the embodiments of the present invention herein described can be used in combination with other modules, described in companion or in previous patent applications.

Figure 1:
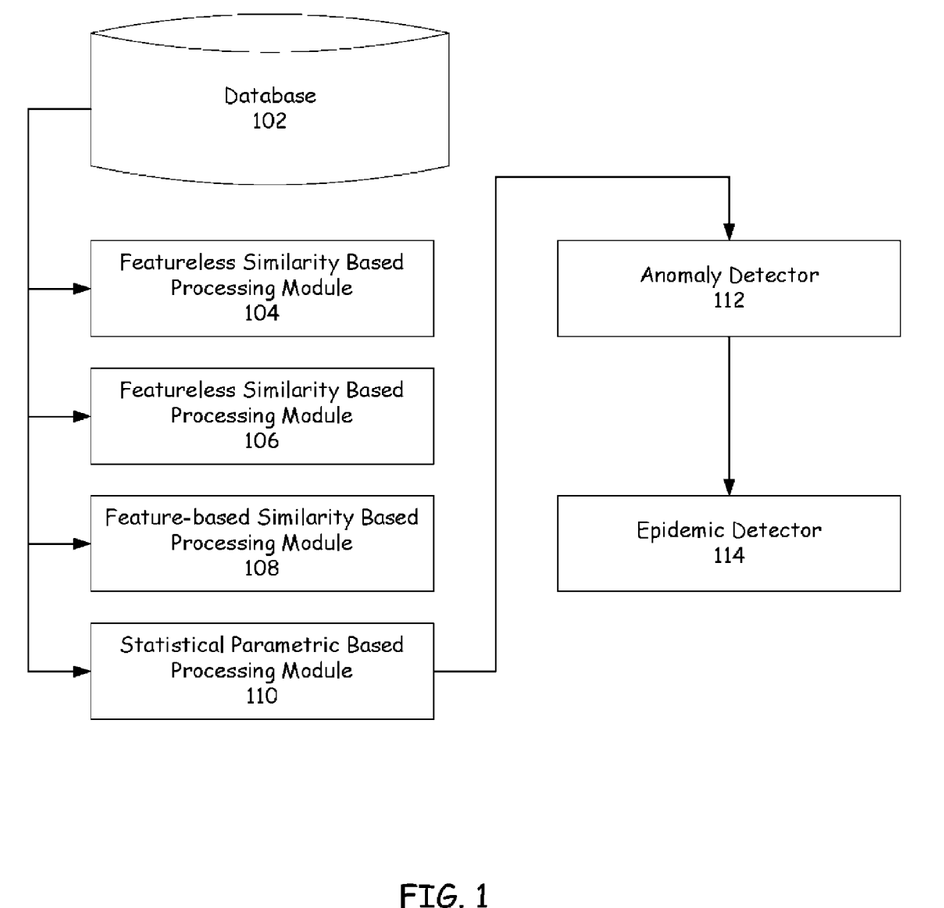
FIG. 1 depicts an architecture in accordance with an embodiment of the present invention used for "Epidemic Detection"

FIG. 1 depicts an architecture in accordance with an embodiment of the present invention used for "Epidemic Detection". The purpose of this architecture is to provide an early-warning system 100 to detect epidemics among units in a dynamic environment, before the epidemic effects becomes overwhelming obvious. An epidemic is a system-level phenomenon that affects large number of units in a population within a short time-period. An epidemic can produce relatively high demands on resources required to address the problem, and on the time period needed to assemble such resources, impacting the operational readiness of the units.

Architecture 100 includes a database 102 that provides data which may be processed using processing modules 104, 106, 108 and 110 to detect anomalies. The results of these processing modules are provided to an anomaly detector 112. Outputs of anomaly detector 112 are used by epidemic detector 114 to identify potential epidemics. The anomaly detector 112 may identify the number of anomalies and the units associated with these anomalies. This information in turn is used to identify normal operations, individual units with medium anomalies, units with large anomalies and the times of these anomalies. Processing module 104 may be a featureless similarity detector based on a Kolmogorov complexity model. Anomaly detector 106 may identify featureless similarities based on self-organizing maps (SOMs) as disclosed in U.S. patent application Ser. No. 12/581,402 which is hereby incorporated by reference for all purposes.

Processing module 108 may be a feature-based similarity detector using evolutionary algorisms and fuzzy clustering such as that provided in U.S. patent application Ser. No. 11/216,940 which is hereby incorporated by reference for all purposes. Processing module 110 may apply other approaches such as statistical parametric analysis such as but not limited to Gaussian Mixture Modeling, Hidden Markov Models, and Reliability Models. The results of this architecture will provide a description of a potential epidemic-may detect a potential epidemic by identifying the number of units affected, the potential escalation size, the time of detection, the certainty measure of the epidemic and the degree of severity.

In a first example, units, environments, and epidemics, may be associated with a fleet of commercial or military aircrafts flying according to the operational schedule of their flights/missions. Each aircraft has an event-log, in which the aircraft computer systems or its main components (e.g. engines) computer system record time-stamped event messages. Each event could be a routine event (e.g. take-off) or an abnormal event (e.g., a mismatch between two sensor readings). At the end of the flight, the event log has a chronological list of all the events that occurred during the flight. This event-log characterizes the behavior of that specific aircraft during that flight. Based on pilot's debriefing/report, the flight can be labeled as normal or abnormal. Then one can represent each aircraft flight as an object in an event space in which the aircraft's behavior is compared with the behavior of the same aircraft during previous flights. Similarly, one can analyze two or more aircrafts during their flights, observe their distances [using the NCD complexity metrics] and compare them with their distances during previous flights.

As this information is examined over time, one can determine if an aircraft's behavior is changing with respect to its past history or whether it no longer behaves like other peer aircrafts, with which exhibited similarity in the past.

Another example is a fleet (set or large number) of medical imaging equipment, e.g., CT scanners. Each scanner has an event-log, in which the scanner computer system record time-stamped event messages. Each event could be a routine event (e.g. warm-up phase) or an abnormal event (e.g., a missing library function in a directory). At the end of the scan, the event log has a chronological list of all the events that occurred during the scan. This event-log characterizes the behavior of that specific scanner during that scan. Based on radiologist's report, the image resulting from the scan can be labeled as normal or abnormal. Each scanner's scan can be represented as an object in an event space in which the scanner's behavior is compared with the behavior of the same scanners during previous scans. Similarly, one can analyze two or more scanners during their scans, observe their distances [using the NCD complexity metrics] and compare them with their distances during previous scans.

Figure 2:
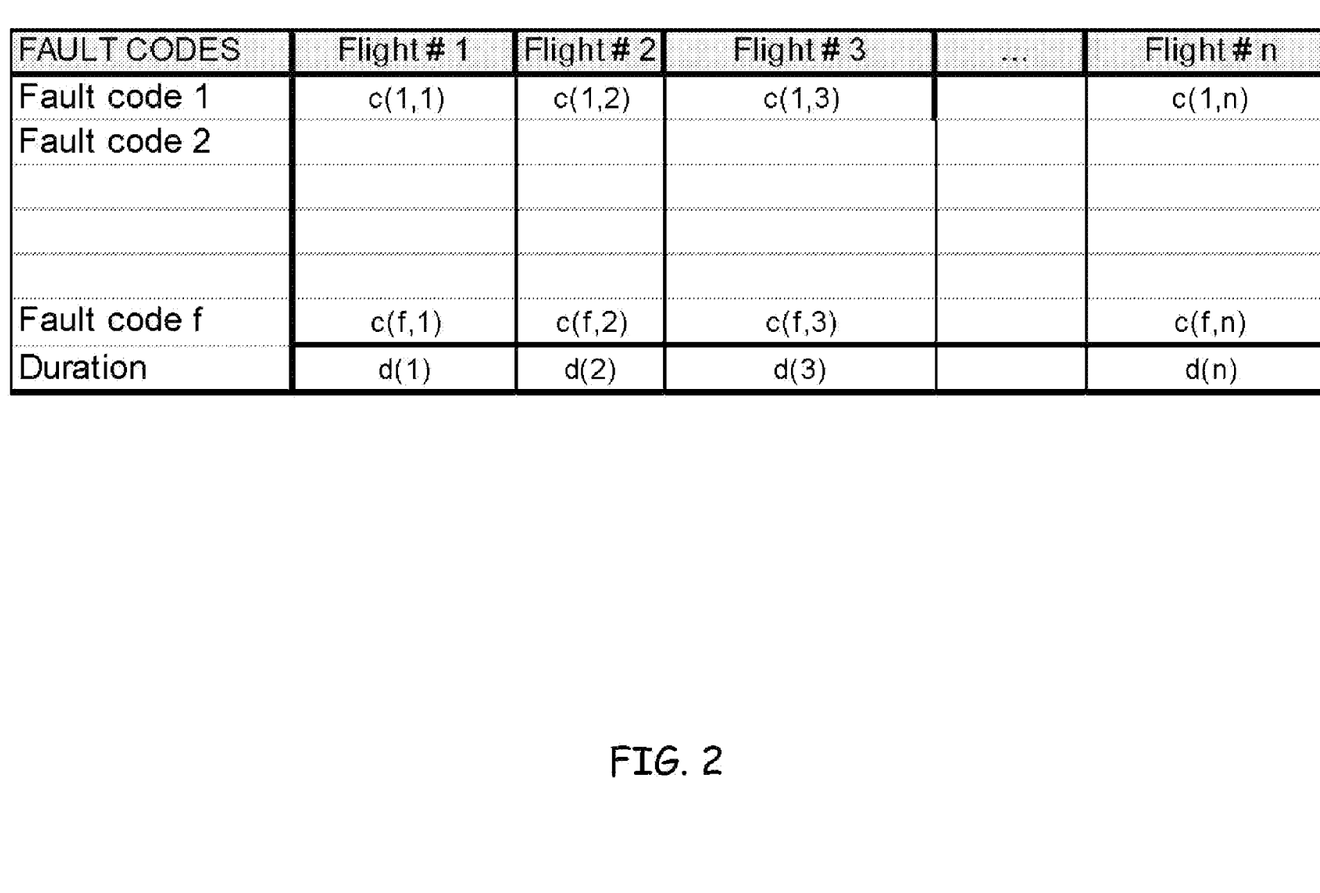
FIG. 2 provides an example of a Matrix M in accordance with embodiments of the present invention.

Processing Module 104 may provide an anomaly detector using Featureless Similarity that may be based on Kolmogorov Complexity. As an illustrative example, within the context of monitoring an aircraft over numerous flights, FIG. 2 provides an example of a table, or Matrix M, summarizing the event logs of FADEC messages collected over each flight represents the raw data. one can encode such information as a matrix M, of dimension [f+1, n], where f is the number of different FADEC messaged recorded over all flights, and n is the total number of flights. Each column represents the count of different FADEC messages recorded during that flight. At the end of each column one can also record the flight duration.

FIG. 2 provides an example of a Matrix M in accordance with embodiments of the present invention. The entry c(i,j) represents the number of occurrences of fault code "i", during flight "j". one can normalize the counts by the total count, changing the entries from counts to frequencies. Thus, the normalized entry freq(i,j) is computed as:

$$freq(i, j) = \frac{c(i, j)}{\sum_{i=1}^{f} \sum_{j=1}^{n} c(i, j)}$$

Now each flight "j" can be represented each flight by a string containing the frequencies:

[freq(1,j), freq(2,j), ... freq(f,j)]

Optionally, one could also append the flight duration or normalize the frequencies by duration. In one example, consider 84 consecutive flights of the same aircraft (n=84). Each string is referred to as $x_i$, where i=1, ..., n.

For each pair of flights $(x_i, x_j)$ the Normalized Compression Distance NCD$(x_i, x_j)$ may be computed as follows:

$$NCD(x_i, x_j) = \frac{C(x_i, x_j) - \min\{C(x_i), C(x_j)\}}{\max\{C(x_i), C(x_j)\}}$$

Any standard compressor may be used in the computation. One such compressor is GenCompress, a publicly-available compressor. The result is a 84×84 dissimilarity matrix:

$$D(x_i, x_j) = [NCD(x_i, x_j)].$$

Figure 3:
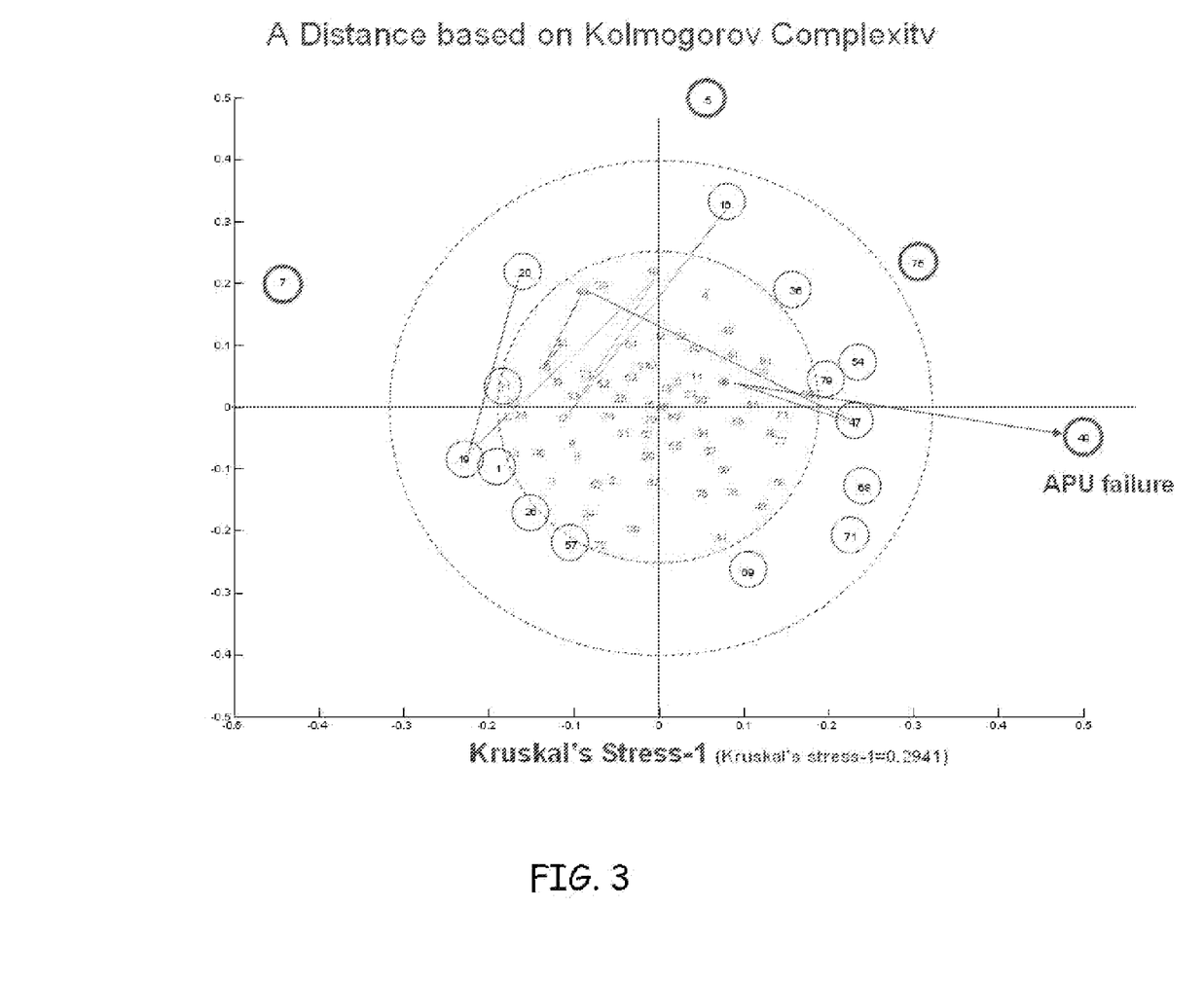
FIG. 3 provides a Kruskal's Stress-1 projection of 84 dimensional matrix D in accordance with embodiments of the present invention.

Each entry is a normalized distance value in the interval [0,1]. When i=j, NCD$(x_i, x_i)$=0. Also, NCD$(x_i, x_j)$=NCD$(x_j, x_i)$, so matrix D is symmetric, with 0 diagonal. One can visualize the content of the matrix D by projecting it onto a 2-dimensional space. There are many ways to implement this projection, for instance by using a Kruskal's Stress-1 projection that minimizes the overall distortion caused by the projection, or by using Self-Organizing Maps (SOMs) that map it to a pre-specified granularity. FIG. 3 provides for the use of Kurskal's Stress-1 approach to perform this projection in accordance with embodiments of the present invention. From FIG. 3, one may observe that the region of normality is centered around the origin, and that a larger distance from the origin represents flights that are quite different from normal operations, and therefore are possible anomalies.

FIG. 3 provides a Kruskal's Stress-1 projection of 84 dimensional matrix D in accordance with embodiments of the present invention. By continuously monitoring and tracking new flights, computing the NCD with previous flights, and projecting them onto this 2-dimensional map, one can be able to classify those flights that are potential anomalies. A (normalized) distance from the origin could be used as the degree of anomaly of the flight. This information could then be fused with similar metrics from other classifiers to increase the decision's robustness.

Figure 4:
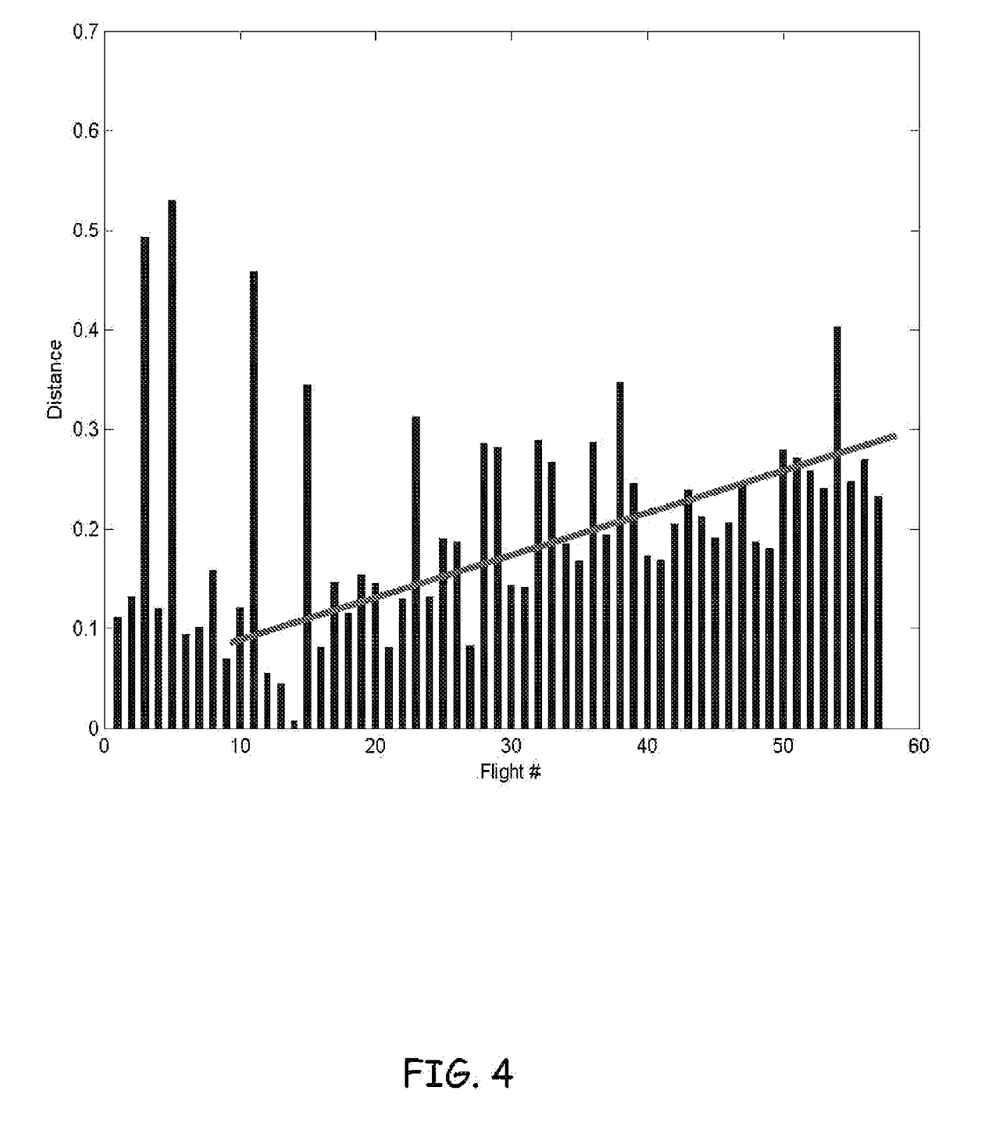
FIG. 4 provides 1-D plot from the Kruskal's Stress-1 projection of 84 dimensional matrix D of FIG. 3 in accordance with embodiments of the present invention.

Since changes over time of the unit's behavior are of interest, one can actually generate a 1-D plot from the Kruskal's Stress-1 2D-projection. By plotting the distanced from the center over time, one can detect trends of increasing distances that might lead to forecasting anomalies before they actually happen. This is illustrated in FIG. 4, for an aircraft with a history of 57 flights. The process to create the featureless detector is illustrated in FIG. 5.

Figure 5:
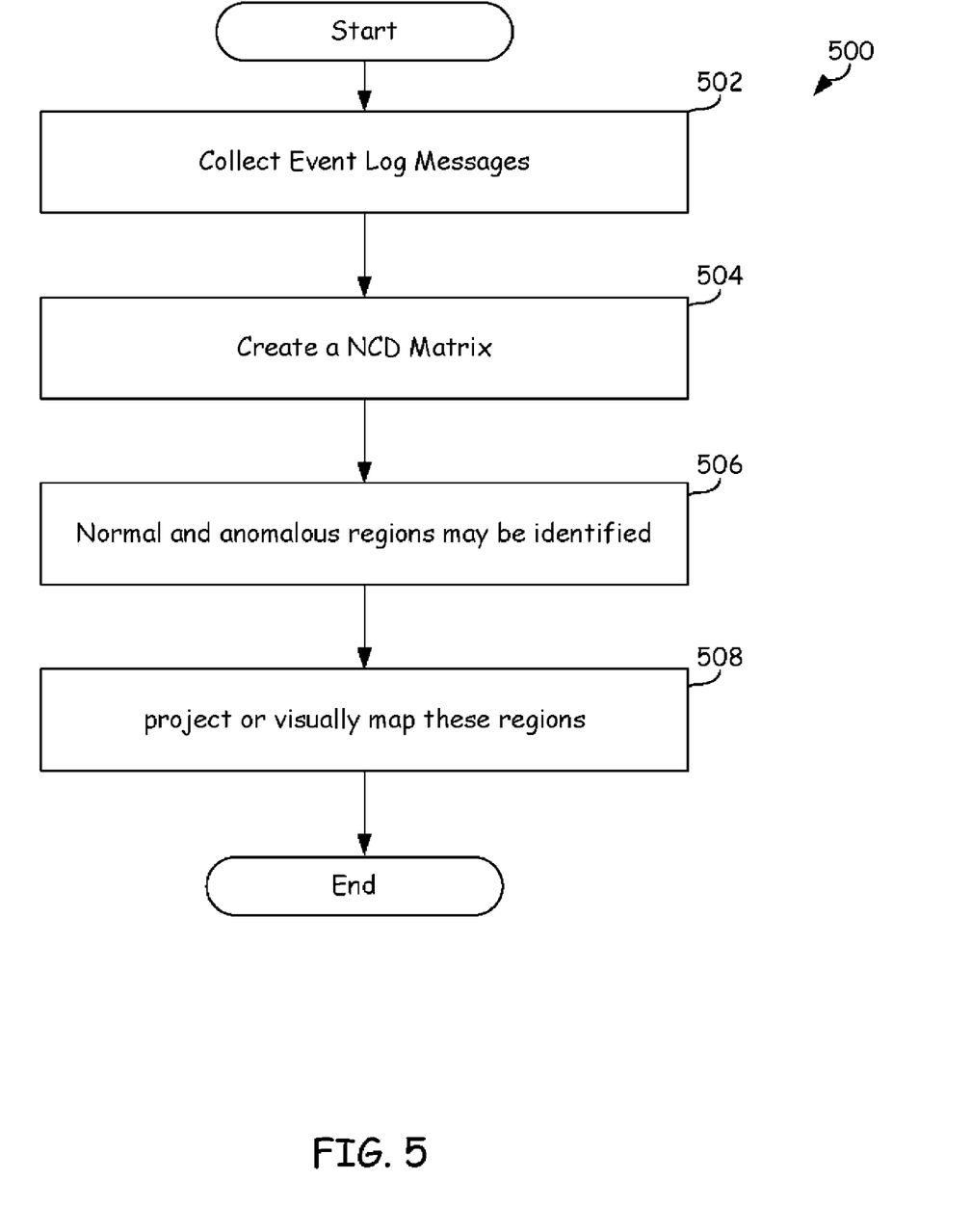
FIG. 5 provides a logic flow diagram associated with a process to create the featureless detector provided by embodiment of the present invention FIG. 6 provides multi-dimensional plot where a distance in this feature space can be used to indicate the degree of anomaly of each flight in accordance with embodiments of the present invention.

FIG. 5 provides a logic flow diagram associated with a process to create the featureless detector provided by embodiment of the present invention. Operations 500 begin with the collection of event log messages in Step 502. These messages may be used to create a NCD matrix. This matrix may be used to describe a degree of anomaly associated with the event log messages in NCD matrix. Normal anomalous regions may be identified in Step 506 based on the NCD computation matrix. These may be used to then detect anomalous conditions and will provide a featureless detector operable to detect anomalous conditions in accordance with embodiments of the present invention.

This process may be Extended to provide Detectors using Featureless Similarity [based on Kolmogorov Complexity] with some taxonomic information. In the above example, flights of the same aircraft (or two scans of the same scanner) may be characterized as two strings:

Flight $j$=[freq(1,$j$), freq(2,$j$), ... freq($f,j$)]

Flight $k$=[freq(1,$k$), freq(2,$k$), ... freq($f,k$)]

With this characterization, one can computed the distance

Dissimilarity(Flight $j$, Flight $k$)=NCD(Flight $j$, Flight $k$)

which defines their dissimilarity. This step can be considered as a dimensionality reduction, from f (length of the string) to 1 (the scalar NCD). By doing this on all pairs, we computed the NCD matrix, and we provided 2D and 1D visualization, highlighting possible anomalies over the flights.

This approach assumes that there is no available domain knowledge. This would be the case for instance if we had FADEC messages but no data dictionary to decode them. Hence the string [freq(1,j), freq(2,j), ... freq(f,j)] has no ordering information.

A more common case, may allow one to assume some amount of domain knowledge, such as the facts that some of the messages are correlated, as they refer to the same component or subsystem. Therefore, one could now leverage knowledge and cluster all related event messages. For example, one could consider that in the FADEC message of an aircraft engine, messages covering events associated with parts/subsystems, such as Variable Bleed Valve (VBV), High Pressure Turbine (HPT), Low Pressure Turbine (LPT), Electronic Engine Control (EEC), Variable Stator Vein (VSV), etc. For notation's simplicity, let's label these clusters as:

$C_1$=Variable Bleed Valve: VBV $C_2$=High Pressure Turbine: HPT $C_3$=Low Pressure Turbine: LPT $C_4$=Electronic Engine Control: EEC

...

$C_n$=Variable Stator Vein: VSV

We can segment the string

Flight $j$=[freq(1,$j$), freq(2,$j$), ... freq($f,j$)]

as:

Flight $j$=[freq($C1\_1,j$), freq($C1\_2,j$), ... freq($C2\_1$, $j$), freq($C2\_2,j$), ..., freq($Cn\_1,j$), freq($Cn\_2$, $j$), ...]

When comparing flight j and flight k, instead of generating a scalar distance NCD(Flight j, Flight k), one may generate a vector of distances.

Dissimilarity(Flight $j$, Flight $k$)=[NCD($C_1$_Flight $j$, $C_1$_Flight $k$), NCD($C_n$_Flight $j$, $C_n$_Flight $k$)].

Element "i" in the above vector, i.e., NCD(Ci_Flight j, Ci_Flight k), represents the distance within the same component/subsystem "i", over the two flights. one could consider this step as a dimensionality reduction, from f (length of the string) to n (the number of clusters).

There are many possible next steps to reduce this vector to a scalar value indicating overall dissimilarity or to use this vector to provide additional diagnostic information. One of the simplest steps would be to use an aggregation function, such as a Euclidean Distance defined on the n-dimensional space, i.e.:

$$\text{Dissimilarity (Flight } j, \text{Flight } k) = \sqrt{\sum_{i=1}^{n} (NCD(C_i\_\text{Flight } j, C_i\_\text{Flight } k))^2}$$

This would consider each element NCD($C_i$_Flight j, $C_i$_Flight k), as an equally important component of the overall distance (or dissimilarity). If some components are to be considered more crucial than others, one could use a Weighted Euclidean Distance, where the weights represent the criticality/relevance of each component considered, i.e.:

$$\text{Dissimilarity (Flight } j, \text{Flight } k) = \sqrt{\sum_{i=1}^{n} (W_i \times NCD(C_i\_\text{Flight } j, C_i\_\text{Flight } k))^2}$$

One could further improve our detection if one can define a string corresponding to a golden standard for a normal flight. one could use historical data, the centroid of many normal flights, or one could create a "virtual normal flight" using domain knowledge. Let's refer to this as Normal_Flight. We use the function Dissimilarity(Flight j, Normal_Flight) as a way of removing the Normal_Flight offset from the other flights (similar to removing the mean from a time series).

$$\text{Dissimilarity (Flight } j, \text{Normal\_Flight}) = \sqrt{\sum_{i=1}^{n} (W_i \times NCD(C_i\_\text{Flight } j, C_i\_\text{Normal\_Flight}))^2}$$

Now, one could also take advantage of the dimensionality reduction to perform unsupervised clustering in the n-dimensional space, which would have been prohibitive in the original f-dimensional space. This would give as a grouping of flights as they differ more and more from the origin (represented by Normal_Flight).

One could further improve this method, moving from detection to diagnostics, if one had additional knowledge, such as a label of the failure mode associated with a given string. Now one could use the set of n-dimensional vectors Dissimilarity(Flight j, Normal_Flight), for all labeled flights, as a training set to perform supervised clustering. one can use neural networks or other similar supervised learning techniques to define a map from an n-dimensional vector to a failure mode.

Processing Module 106 of FIG. 1 provides an anomaly Detector using Featureless Similarity [based on Self Organizing Maps].

Processing Module 108 of FIG. 1 provides an anomaly Detector using Feature-based Similarity [based on Evolutionary Algorithms and Fuzzy Clustering]. Such an anomaly detector is disclosed in METHOD AND SYSTEM FOR FORECASTING RELIABILITY OF ASSETS", filed on Aug. 31, 2005 which is incorporated by reference for all purposes. This anomaly detector provides an approach where the time-to-failure prediction for each individual unit is computed by aggregating its own track record with that of a number of 'peer' units—units with similarities along three key dimensions: system design, patterns of utilization, and maintenance history. The notion of a 'peer' is close to that of a 'neighbor' in CBR, except the states of the peers are constantly changing. Odometer-type variables like mileage and age increase, and discrete events like major maintenance or upgrades occur. Thus, it is reasonable to assume that after every significant mission, the peers of a target unit may change based upon changes in both the unit itself, and the fleet at large. This is in contrast to a conventional diagnostic system such as the locomotive CBR system, where, once stored in the case base, the case description remains static. Our results suggest that estimating unit performance from peers is a practical, robust and promising approach. Two experiments were conducted-retrospective estimation and prognostic estimation. In the first experiment, we explored how well the median time-to-failure for any unit can be estimated from the equivalent median of its peers. In the second experiment, for a given instant in time, we predicted the time to the next failure for each unit using the history of the peers. In all these experiments, the estimated median time-to-failure or the predicted remaining life is used to sort the units in decreasing order. The selection of the best N units is done according to this sorting. The precision of such a selection the ratio of the correctly selected units among the best N units (based on ground truth). These experiments showed the applicability of evolutionary algorithms, used in a wrapper approach, to select the best attributes for representing peers and to define similarity measures for identifying the most similar peers for a given unit. By evolving the models over different time slices, we have shown our ability to dynamically adapt the neighborhoods of peers using operational and maintenance data.

Figure 6:
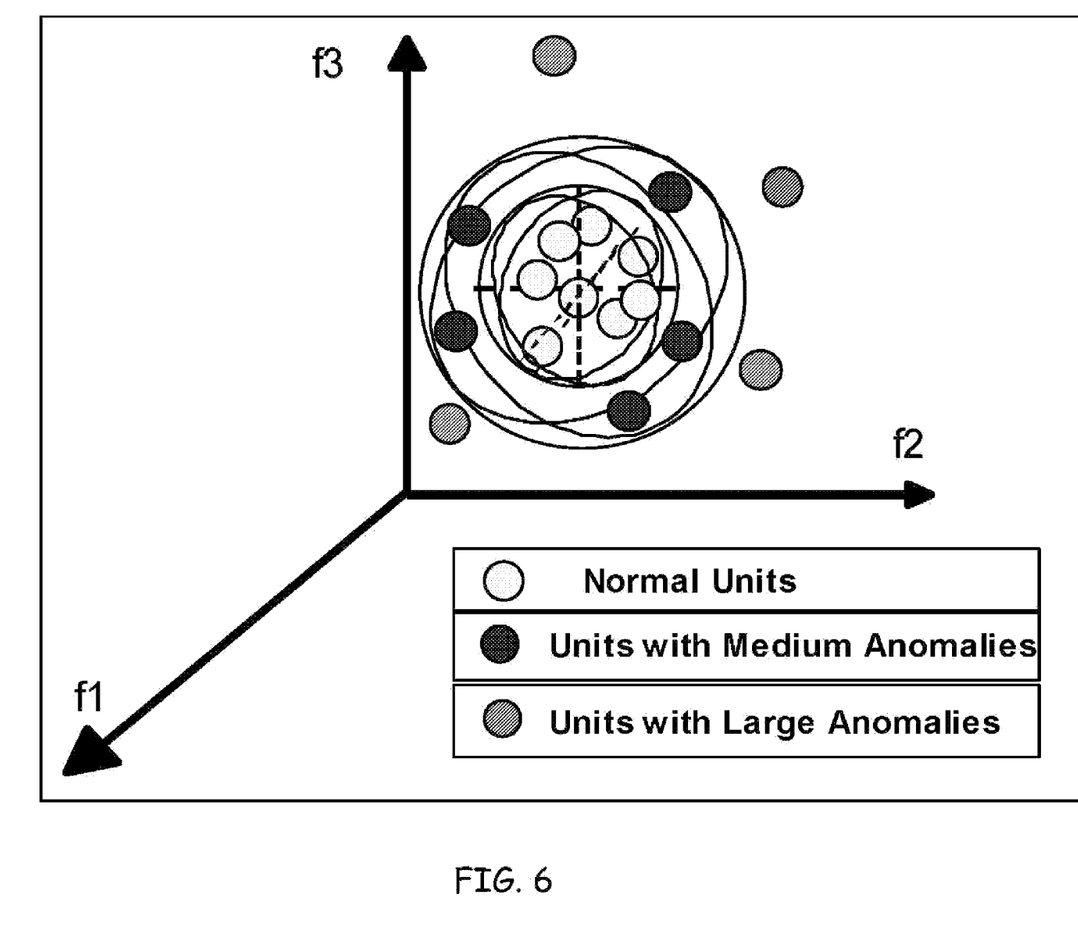

FIG. 6 provides multi-dimensional plot where a distance in this feature space can be used to indicate the degree of anomaly of each flight in accordance with embodiments of the present invention. One can use the same approach to identify the key features that will better highlight anomalies. Using historical data one can label certain flights as anomalous and use it in the fitness function to evolve the classifier. At the end of the last generation, one can have a feature subset, optimized for the anomaly detection. Again a distance in this feature space can be used to indicate the degree of anomaly of each flight. The process to create such a feature-based classifier is illustrated in FIG. 7.

Figure 7:
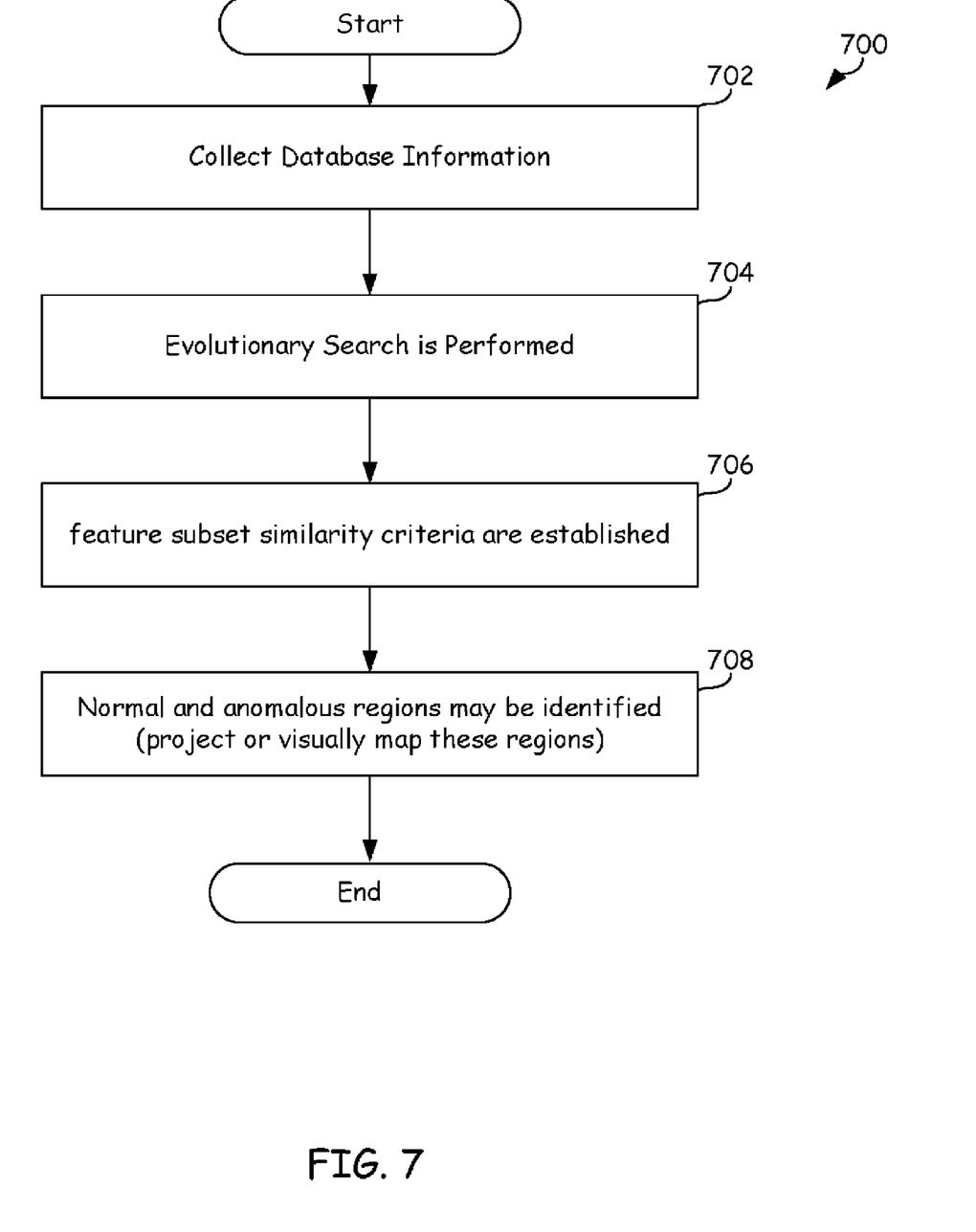
FIG. 7 provides a logic flow diagram associated with a process to create the feature-based detector provided by embodiment of the present invention

FIG. 7 provides a logic flow diagram associated with a process to create the feature-based detector provided by embodiment of the present invention. Operations 700 begin with the collection of database information in step 702. This collection of database information may include but is not limited to utilization operations, maintenance actions, part orders, and configuration databases. In Step 704 an evolutionary search is preformed. This may be performed using a wrapper approach. Then in Step 706 the feature subset similarity criteria are established such that a feature-based detector is provided in Step 708.

The results of the anomaly detectors provided by processing modules 104, 106, 108 and 110 are combined to provide an improved output. A property of any given classifier is the so-called performance ceiling. That is, given the data and resources at hand, further tuning will not improve the performance any further. Overcoming the performance ceiling is a strong motivator to use a classifier fusion system. Such a fusion scheme gathers and combines the results of different classification tools to maximize the advantages of each one while minimizing the disadvantages. The fusion system holds the promise to deliver a result that is better than the best result possible by any one tool employed. In part this can be accomplished because redundant information is available, which when combined correctly improves the estimate of the better tool and compensates for the shortcomings of the less capable tool. More importantly, these different classifiers need to be diverse (making classification errors on different examples). Therefore, one important question to be answered is how to generate accurate and diverse individual classifiers. In addition, it is significant what method of combining classifiers is chosen. There are numerous possible approaches, which need to be explored to arrive at the desired level of accuracy, robustness, and computational speed.

The design of a successful classifier fusion system consists of two important parts: design of the individual classifiers, selection of a set of classifiers, and design of the classifier fusion mechanism. Key to effective classifier fusion is the diversity of the individual classifiers. Strategies for boosting diversity include: 1) using different types of classifiers; 2) training individual classifiers with different data set (bagging and boosting); and 3) using different subsets of features. The proposed classifiers, based on featureless similarity, feature-based similarities, and other approaches, exhibit this diversity. Their fusion will provide us with greater robustness to design assumption violations, and will reduce the variance of the fused decision.

In summary, embodiments of the present invention provide for the monitoring dynamic units that operate in complex, dynamic environments, in order to classify and track unit behavior over time. When domain knowledge is available, feature-based models may be used to capture the essential state information of the units. When domain knowledge is not available, raw data is relied upon to perform this task. By analyzing logs of event messages (without having access to their data dictionary), embodiments allow the identification of anomalies (novelties). Specifically, a Normalized Compression Distance (such as one based on Kolmogorov Complexity) may be applied to logs of event messages. By analyzing the similarity and differences of the event message logs, units are identified that did not experience any abnormality (and locate regions of normal operations) and units that departed from such regions. Of particular interest is the detection and identification of units' epidemics, which is defined as sustained/increasing numbers of anomalies over time. This approach can be applied to a variety of domains, from monitoring a fleet of aircraft based on FADEC messages, to monitoring a fleet of CT scanners, based on their message logs.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Although the present invention is described in detail, it should be understood that various changes, substitutions and alterations can be made hereto without departing from the spirit and scope of the invention as described by the appended claims.

What is claimed is:

1. A method to monitor dynamic units that operate in dynamic environments comprising:
    collecting raw data to capture state information of the units;
    using a processor to analyze the raw data by obtaining a set of normalized compression distance (NCD) of the raw data based on a Kolmogorov complexity to identify an anomaly in a unit
    visualizing the set of NCD in a two dimensional space;
    minimizing distortion of the visualization by using a Kruskal's Stress-1 projection;
    wherein the raw data is obtained by tracking an aircraft flight, the method further comprising tracking additional aircraft flights, computing a set of NCD for each additional flight, projecting the set of NCD in a two dimensional space for viewing, and classifying flights that are potential anomalies.

2. The method of claim 1, wherein the raw data comprises event message logs.

3. The method of claim 1, further comprising generating a one dimensional plot from the two dimensional projection to detect a trend of an anomaly.

4. The method of claim 1, further comprising detecting an epidemic, wherein an epidemic comprises sustained/increasing numbers of anomalies over time.

5. The method of claim 1, wherein the raw data comprises FADEC messages associated with a fleet of aircraft.

6. The method of claim 1, wherein the units comprise CT scanners.

7. The method of claim 1, further comprising: capturing state information of the units when domain knowledge is available with a feature-based models; and analyzing the state information to identify anomalies.

8. The method of claim 7, wherein identifying abnormalities and regions of normal operations associated with units comprises combining: featureless similarity based anomaly detection; feature-based similarity based anomaly detection; and statistical parametric analysis.

9. A method to monitor dynamic units that operate in dynamic environments comprising:
  defining a virtual string of data for a normal operation of the units in which no anomalies occur;
  collecting raw data to capture state information of the units;
  using a processor to analyze the raw data by obtaining a set of normalized compression distance (NCD) of the raw data versus the virtual string of data for a normal operation and based on a Kolmogorov complexity to identify anomaly in a unit; and
  visualizing the set of NCD in a two dimensional space;
  wherein the raw data is obtained by tracking an aircraft flight, the method further comprising tracking additional aircraft flights, computing a set of NCD for each additional flight, projecting the set of NCD in a two dimensional space for viewing, and classifying flights that are potential anomalies.

10. The method of claim 9, wherein the raw data comprises event message logs.

11. The method of claim 9, wherein the virtual normal data is obtained from a centroid of many unit operations.

12. The method of claim 9, further comprising performing unsupervised clustering of the set of NCD.

13. The method of claim 9, wherein an epidemic comprises sustained/increasing numbers of anomalies over time.

14. The method of claim 9, wherein the raw data comprises FADEC messages associated with a fleet of aircraft.

15. The method of claim 9, wherein the units comprise CT scanners.

16. The method of claim 9, wherein the units are part of a fleet that operates in dynamic environments.

* * * * *